US008626059B2

(12) United States Patent
Kobayashi

(10) Patent No.: US 8,626,059 B2
(45) Date of Patent: Jan. 7, 2014

(54) MOBILE TERMINAL, BASE STATION, COMMUNICATION SYSTEM, AND COMMUNICATION METHOD

(75) Inventor: Takaharu Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 12/954,022

(22) Filed: Nov. 24, 2010

(65) Prior Publication Data

US 2011/0136531 A1 Jun. 9, 2011

(30) Foreign Application Priority Data

Dec. 4, 2009 (JP) ................................ 2009-276278

(51) Int. Cl.
*H04B 7/15* (2006.01)
(52) U.S. Cl.
USPC ...................................... 455/11.1; 455/67.11
(58) Field of Classification Search
USPC ................. 455/7, 11.1, 13.1, 15, 16
See application file for complete search history.

(56) References Cited

U.S. PATENT DOCUMENTS

| | | | | |
|---|---|---|---|---|
| 8,238,812 | B2* | 8/2012 | Kim et al. | 455/7 |
| 2007/0141991 | A1 | 6/2007 | Hong | |
| 2007/0245204 | A1* | 10/2007 | Yomo et al. | 714/749 |
| 2008/0108304 | A1 | 5/2008 | Suga | |

FOREIGN PATENT DOCUMENTS

| | | |
|---|---|---|
| CN | 101296060 | 10/2008 |
| EP | 1 843 488 | 10/2007 |
| JP | 2004-248210 | 9/2004 |
| JP | 2006-66948 | 3/2006 |
| JP | 2007-266876 | 10/2007 |
| JP | 2008-118499 | 5/2008 |
| JP | 2008-154040 | 7/2008 |

OTHER PUBLICATIONS

Extended European Search Report with written opinion, issued for corresponding European Patent Application No. 10193323.2, dated Apr. 1, 2011.

* cited by examiner

*Primary Examiner* — Tu X Nguyen
(74) *Attorney, Agent, or Firm* — Myers Wolin, LLC

(57) ABSTRACT

A terminal includes a data receiver that receives data transmitted by a base station to another mobile terminal, a response receiver that receives from the other mobile terminal a negative acknowledgement response indicating that the other mobile terminal has failed to receive the data normally, and a data transmitter that transmits to the other terminal the data, received by the data receiver, in response to the negative acknowledgement response received by the response receiver.

13 Claims, 12 Drawing Sheets

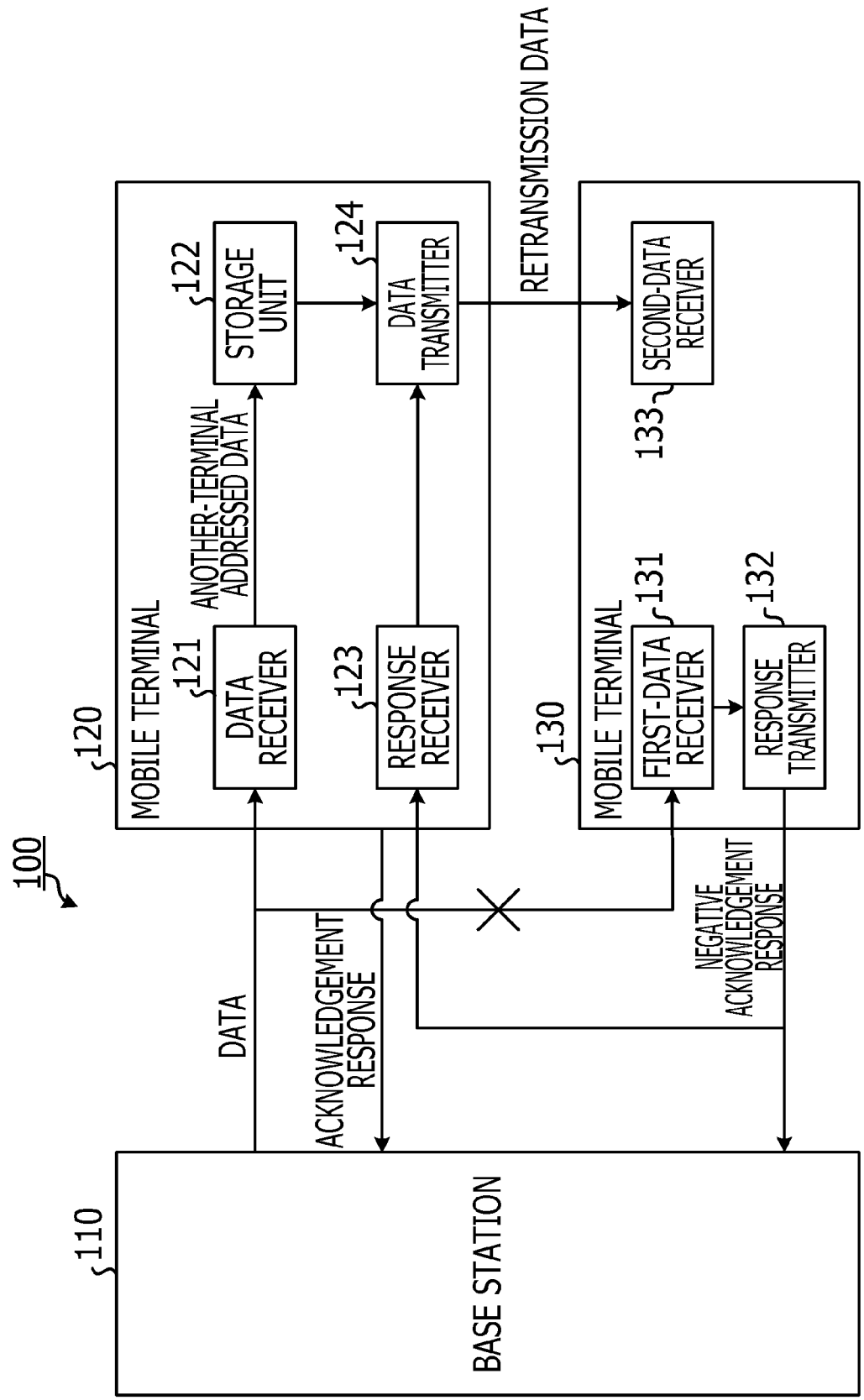

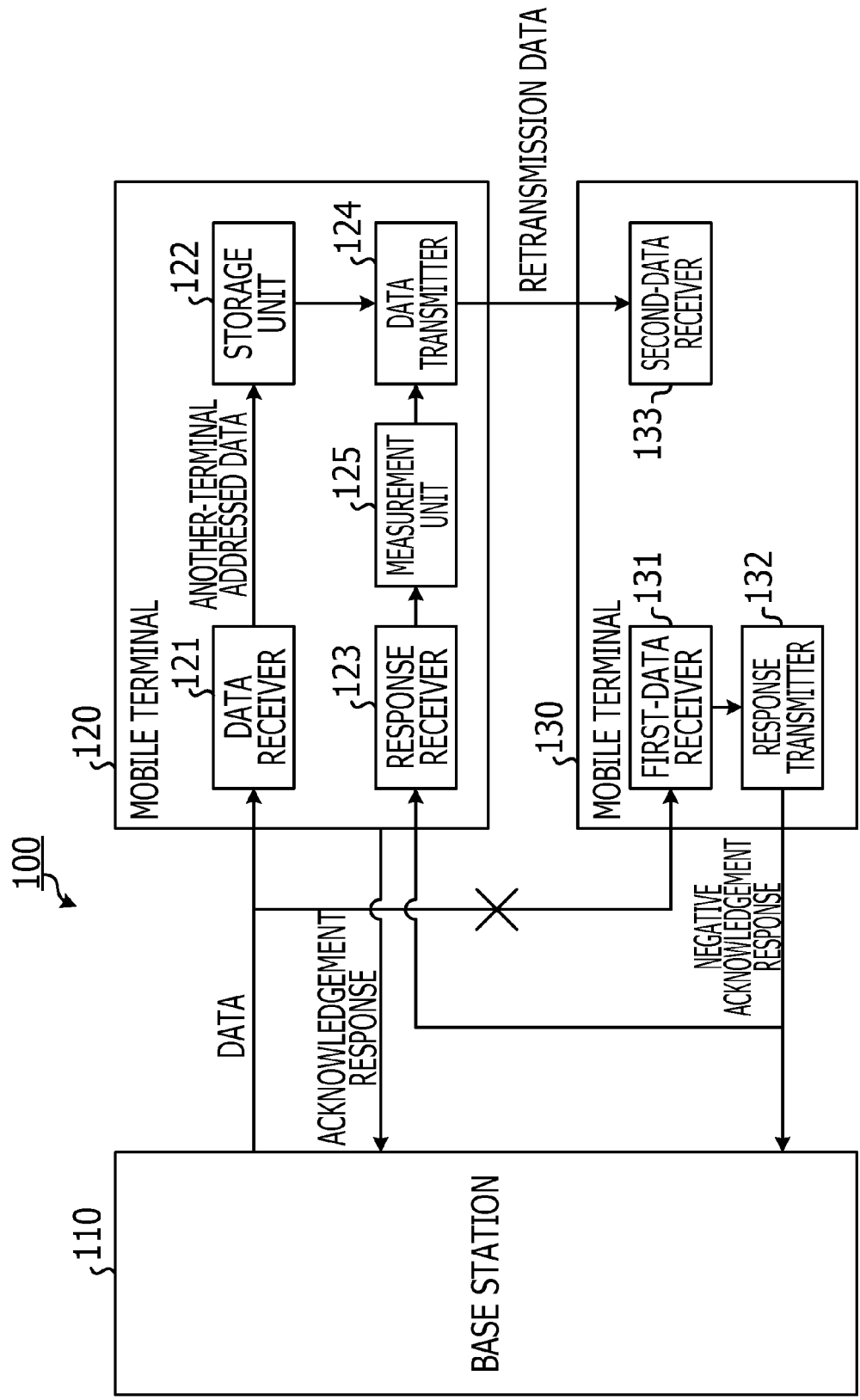

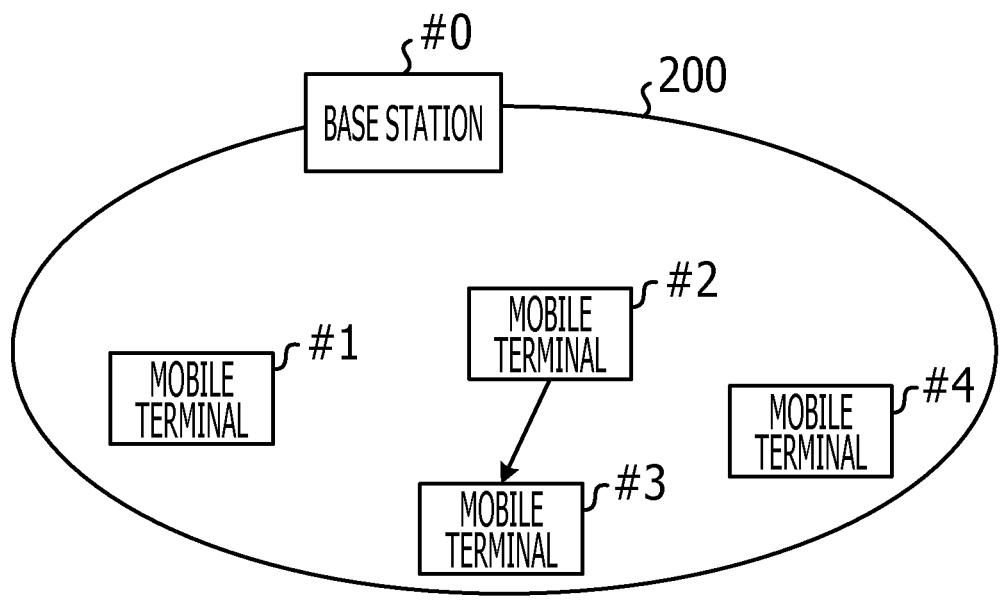

MOBILE TERMINAL, BASE STATION, COMMUNICATION SYSTEM, AND COMMUNICATION METHOD

CROSS-REFERENCE TO RELATED APPLICATIONS

This application is based upon and claims the benefit of priority of the prior Japanese Patent Application No. 2009-276278, filed on Dec. 4, 2009, the entire contents of which are incorporated herein by reference.

FIELD

The present invention relates to a mobile terminal, a base station, a communication system, and a communication method.

BACKGROUND

General cellular systems employ single-hop communication that is directly performed between a base station and a radio terminal (e.g. mobile terminal). Besides single-hop communication, multi-hop communication causing a radio terminal to relay traffic from another radio terminal has also been studied (as described in Japanese Laid-open Patent Publication No. 2004-248210).

In the field of mobile radio communications, error compensation techniques for compensating for an error taking place over a radio communication path are used (as described in Japanese Laid-open Patent Publication No. 2006-066948, for example). The error compensation techniques include automatic repeat request (ARQ). In ARQ, a receiver side detects an error on a per packet basis using an error detection code attached to a transmission packet by a transmitter side. If no error is detected, the receiver side then returns an acknowledgement (ACK) signal to the transmitter side, and requests the transmitter side to transmit a next packet. If an error is detected, the receiver side returns a negative acknowledgement (NACK) signal to the transmitter side and requests the transmitter side to retransmit the packet.

To reduce the number of retransmissions of ARQ, hybrid ARQ (HARQ) has been used recently. In HARQ, a reception packet is stored on the receiver side if an error is detected. The reception packet is combined with a packet retransmitted in response to a retransmission request, and a combined packet is demodulated. Reception characteristics during the retransmission are thus improved.

The above-described related art techniques have difficulty in transferring data efficiently. For example, in the multi-hop communication, the relaying by the mobile terminal causes a transfer delay of the data. In the single-hop communication, data is retransmitted from a base station if an error takes place, thus the availability of the base station's radio resources becomes tight.

SUMMARY

According to an aspect of the invention, a mobile terminal includes a data receiver that receives data transmitted by a base station to another mobile terminal, a response receiver that receives from the other mobile terminal a negative acknowledgement response indicating that the other mobile terminal has failed to receive the data normally, and a data transmitter that transmits to the other mobile terminal the data, received by the data receiver, in response to the negative acknowledgement response received by the response receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1A is a block diagram of a communication system of one embodiment;

FIG. 1B is a block diagram illustrating a modification of the communication system of FIG. 1A;

FIG. 2E illustrates an operation example of the communication system;

DESCRIPTION OF EMBODIMENTS

Figure 1C:
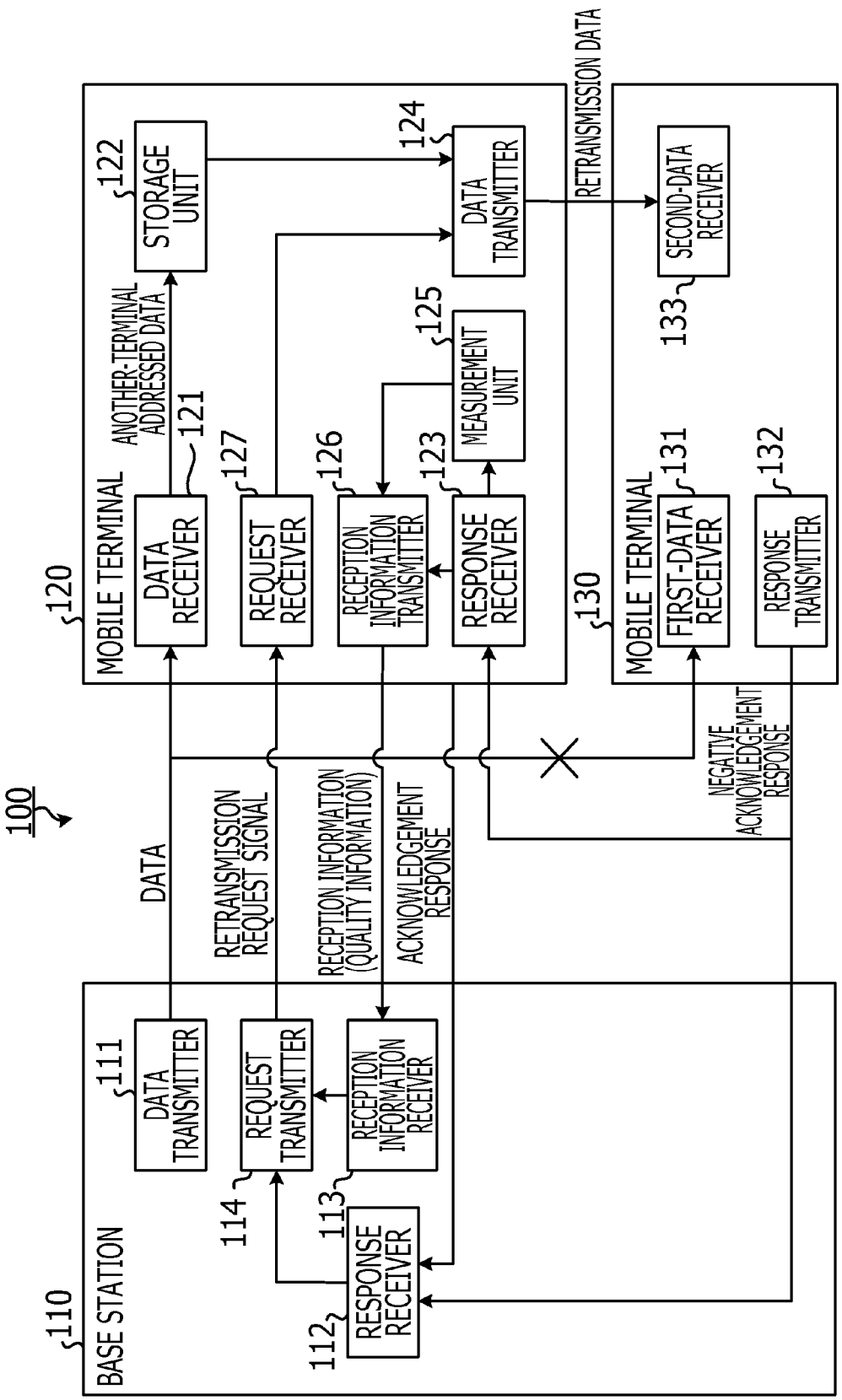
FIG. 1C is a block diagram illustrating a modification of the communication of FIG. 1B.

Referring to the accompanying drawings, a mobile terminal, a base station, a communication system, and a communication method as embodiments are described in detail below. In certain embodiments described herein the mobile terminal, the base station, the communication system, and the communication method, the mobile terminal stores data transmitted from the base station, and transmits the data in response to a negative acknowledgement response from another mobile terminal. Thus, the mobile terminal retransmits the data, which was directly transmitted by the base station.

Note that the term "mobile terminal" is not limiting with regard to the mobility of the terminal. In other words, there is no requirement that the terminal have mobility.

Structure Example of Communication System

FIG. 1A is a block diagram of a communication system 100 of one embodiment. Referring to FIG. 1A, the communication system 100 of the present embodiment includes base station 110, mobile terminal 120, and mobile terminal 130. The base station 110 transmits data addressed to each of the mobile terminals 120 and 130. The mobile terminals 120 and 130 are located within the cell of the base station 110, and communicate with the base station 110. The mobile terminals 120 and 130 are located within the same communication coverage area.

The mobile terminal 120 receives data transmitted by the base station 110 to the mobile terminal 130. The mobile terminal 120 also transmits the data to the mobile terminal 130 in response to a negative acknowledgement response related to the data and transmitted by the mobile terminal 130. The mobile terminal 120 includes data receiver 121, storage unit 122, response receiver 123, and data transmitter 124. This data may hereinafter be referenced to as another-terminal addressed data.

The data receiver 121 receives data (the another-terminal addressed data) which the base station 110 has directly transmitted to the mobile terminal 130 in a single-hop mode. The data receiver 121 outputs the received data to the storage unit 122. A transmitter (not illustrated) in the mobile terminal 120 transmits to the base station 110 a response signal related to data addressed to the mobile terminal 120 itself and received by the data receiver 121. In the following discussion, it is assumed that the data addressed to the mobile terminal 120 has been normally received by the data receiver 121 and that the mobile terminal 120 has transmitted an acknowledgement response to the base station 110. The acknowledgement response relating to the normally received data addressed to the mobile terminal 120 itself. Note that data addressed to the mobile terminal 120 itself will be referred to as own-terminal addressed data.

The storage unit 122 stores the data addressed to the mobile terminal 130 and output by the data receiver 121 (the another-terminal addressed data). In one example embodiment, the storage unit 122 may store the another-terminal addressed data received together with own-terminal addressed data by the data receiver 121, and may not store the another-terminal addressed data received separately from the own-terminal addressed data by the data receiver 121. This arrangement reduces a frequency at which the data receiver 121 stores the another-terminal addressed data and lowers process workload of the mobile terminal 120. The storage unit 122 may store the another-terminal addressed data in an undecoded state. This arrangement may eliminate the need to decode the another-terminal addressed data, and lowers the process workload of the mobile terminal 120.

The response receiver 123 receives from the mobile terminal 130 a negative acknowledgement response indicating that the mobile terminal 130 has failed to receive normally the data addressed to the mobile terminal 130. For example, the response receiver 123 may receive the negative acknowledgement response transmitted by the mobile terminal 130 to the base station 110. The response receiver 123 outputs the received negative acknowledgement response to the data transmitter 124.

In response to the negative acknowledgement response received by the response receiver 123, the data transmitter 124 transmits to the mobile terminal 130 the data (retransmission data) stored by the storage unit 122 and addressed to the mobile terminal 130. When the negative acknowledgement response is output from the response receiver 123, the data transmitter 124 reads from the storage unit 122 the data addressed to the mobile terminal 130 as a transmission source of the negative acknowledgement response, and then transmits the read data to the mobile terminal 130.

The mobile terminal 130 includes first-data receiver 131, response transmitter 132, and second-data receiver 133. The first-data receiver 131 receives data directly transmitted by the base station 110 to the mobile terminal 130 in a single hop mode. The first-data receiver 131 outputs to the response transmitter 132 reception results that indicate whether the data has been normally received.

The response transmitter 132 transmits a response signal responsive to the reception results output by the first-data receiver 131. More specifically, if the first-data receiver 131 has failed to receive normally the data addressed to the mobile terminal 130, the response transmitter 132 transmits the negative acknowledgement response indicating that the first-data receiver 131 has failed to receive the data normally. The negative acknowledgement response transmitted by the response transmitter 132 is received by the base station 110 and the mobile terminal 120.

The second-data receiver 133 receives the data (retransmission data) which the mobile terminal 120 has transmitted in response to the negative acknowledgement response from the response transmitter 132. It is noted that the mobile terminal 120 has received the data addressed to the mobile terminal 130. In this way, the mobile terminal 130 may receive from the mobile terminal 120 the data which the mobile terminal 130 has once failed to receive normally from the base station 110.

FIG. 1B is a block diagram of a modification of the communication system of FIG. 1A. Referring to FIG. 1B, elements identical to those illustrated in FIG. 1A are designated with the same reference numerals, and the discussion thereof is omitted. As illustrated in FIG. 1B, the mobile terminal 120 may additionally include a measurement unit 125 beside the structure illustrated in FIG. 1A.

The measurement unit 125 measures a communication quality of the communications between the mobile terminal 120 and the mobile terminal 130. For example, the measurement unit 125 measures as the communication quality a reception quality of the negative acknowledgement response from the mobile terminal 130 output from the response receiver 123. The measurement unit 125 may thus simply measure the communication quality of the communications with the mobile terminal 130. Alternatively, the measurement unit 125 may measure the communication quality based on a reference signal exchanged between the mobile terminal 120 and the mobile terminal 130. The measurement unit 125 outputs the measured communication quality to the data transmitter 124.

The data transmitter 124 transmits the another-terminal addressed data in response to a comparison result between the communication quality and a threshold value output by the measurement unit 125. More specifically, the data transmitter 124 transmits to the mobile terminal 130 the data addressed to the mobile terminal 130 if the communication quality is equal to or higher than a threshold value, and does not transmit to the mobile terminal 130 the data addressed to the mobile terminal 130 if the communication quality is lower than the threshold value.

If the communication quality of communications between the mobile terminal 120 and the mobile terminal 130 is good, the data transmitter 124 may retransmit the data to the mobile terminal 130. If the communication quality of communications between the mobile terminal 120 and the mobile terminal 130 is not good, the data transmitter 124 does not transmit the data to the mobile terminal 130. This arrangement may reduce the workload involved in the transmission process of the mobile terminal 120 and workload involved in the reception process of the mobile terminal 130.

FIG. 1C is a block diagram illustrating a modification of the communication system of FIG. 1B. In FIG. 1C, elements identical to those illustrated in FIG. 1B are designated with the same reference numerals and the discussion thereof is omitted here. Referring to FIG. 1C, the mobile terminal 120 additionally includes a reception information transmitter 126 and a request receiver 127 besides the structure of FIG. 1B. The response receiver 123 outputs the received negative acknowledgement response to the reception information transmitter 126. The measurement unit 125 outputs the measured communication quality to the reception information transmitter 126.

In response to the negative acknowledgement response output by the response receiver 123, the reception information transmitter 126 transmits to the base station 110 reception information indicating that the response receiver 123 has received the negative acknowledgement response from the mobile terminal 130. The reception information transmitter 126 may compare the communication quality output from the measurement unit 125 with a threshold value, and transmit the reception information based on the comparison results. More specifically, the reception information transmitter 126 transmits the reception information to the base station 110 if the communication quality is equal to or higher than the threshold value, and does not transmit the reception information if the communication quality is lower than the threshold value.

The reception information transmitter 126 may transmit to the base station 110 quality information indicating the communication quality output from the measurement unit 125, together with the reception information. In accordance with the communication quality of the communications between the mobile terminal 120 and the mobile terminal 130, the base station 110 may determine whether to request the mobile terminal 120 to retransmit the data to the mobile terminal 130.

The request receiver 127 receives the retransmission request signal that has been transmitted by the base station 110 in response to the reception information transmitted by the reception information transmitter 126. The request receiver 127 outputs the received retransmission request signal to the data transmitter 124.

The data transmitter 124 transmits the another-terminal addressed data in response to the retransmission request signal output from the request receiver 127. More specifically, if the retransmission request signal requesting the mobile terminal 120 to retransmit the data to the mobile terminal 130 is output from the request receiver 127, the data transmitter 124 transmits to the mobile terminal 130 the data addressed to the mobile terminal 130.

The base station 110 communicates with a plurality of mobile terminals (the mobile terminals 120 and 130) receiving the another-terminal addressed data. More specifically, the base station 110 includes data transmitter 111, response receiver 112, reception information receiver 113, and request transmitter 114. The data transmitter 111 transmits data respectively addressed to the mobile terminals 120 and 130.

The response receiver 112 receives response signals from the mobile terminals 120 and 130 responsive to the data transmitted by the data transmitter 111. In the discussion here, it is assumed that the response receiver 112 receives an acknowledgement response from the mobile terminal 120 and a negative acknowledgement response from the mobile terminal 130. The response receiver 112 outputs the received response signals to the request transmitter 114.

The reception information receiver 113 receives the reception signal indicating that the acknowledgement response has been received from the mobile terminal 120 as a transmission source of the acknowledgement response and that the negative acknowledgement response has been received from the mobile terminal 130 as a transmission source of the negative acknowledgement response. The reception information receiver 113 may also receive, together with the reception information, quality information indicating the communication quality of the communications between the mobile terminal 120 as the transmission source of the acknowledgement response and the mobile terminal 130 as the transmission source of the negative acknowledgement response. The reception information receiver 113 outputs the received quality information to the request transmitter 114.

In response to the response signal from the response receiver 112, the request transmitter 114 transmits, to the mobile terminal 120 as the transmission source of the acknowledgement response, the retransmission request signal requesting the mobile terminal 120 to retransmit the data to the mobile terminal 130 as the transmission source of the negative acknowledgement response. The request transmitter 114 may transmit the retransmission request signal to the mobile terminal 120 as the transmission source of the reception information output from the reception information receiver 113. This arrangement allows the retransmission request signal to be transmitted to a mobile terminal communicable with the mobile terminal 130, from among the mobile terminals as the transmission sources of the acknowledgement response.

The request transmitter 114 may transmit the retransmission request signal to a mobile terminal selected in response to the quality information output from the reception information receiver 113, from among the mobile terminals as the transmission sources of the reception information (including the mobile terminal 120). This arrangement allows the retransmission request signal to be transmitted to a mobile terminal having a good communication quality with the mobile terminal 130 (for example, the mobile terminal 120) from among the mobile terminals as the transmission sources of the reception information.

The mobile terminal 120 then transmits the reception information to the base station 110, and the mobile terminal 120 retransmits the data to the mobile terminal 130 in response to the retransmission request signal transmitted by the base station 110 in response to the reception information. In this way, the base station 110 may manage whether the mobile terminal 120 or another mobile terminal retransmits the data addressed to the mobile terminal 130.

This arrangement may prevent a plurality of mobile terminals having received the negative acknowledgement response from the mobile terminal 130 from retransmitting the data to the mobile terminal 130. The mobile terminal 120 transmits, together with the reception information, the quality information to the base station 110. The base station 110 may select a mobile terminal having a good communication quality of communications with the mobile terminal 130, and the selected mobile terminal may thus retransmit the data to the mobile terminal 130.

Hardware Structure Example of Processing Elements

A hardware structure of the base station 110, and the mobile terminals 120 and 130 illustrated in FIGS. 1A-1C is described below. The data receiver 121, the response receiver 123, the data transmitter 124, the reception information transmitter 126, and the request receiver 127 in the mobile terminal 120 may be implemented using arithmetic means, such as a digital signal processor (DSP), and a radio communication interface. The storage unit 122 in the mobile terminal 120 may be implemented using a memory, for example. The measurement unit 125 in the mobile terminal 120 may be implemented using the arithmetic means such as the DSP.

The first-data receiver 131, the response transmitter 132, and the second-data receiver 133 in the mobile terminal 130 may be implemented using arithmetic means, such as a digital signal processor (DSP), and a radio communication interface. The data transmitter 111, the response receiver 112, the reception information receiver 113, and the request transmitter 114 in the base station 110 may be implemented using arithmetic means, such as a digital signal processor (DSP), and a radio communication interface.

Operation Example of the Communication System

FIGS. 2A-2E illustrate operation examples of the communication system 200. In FIGS. 2A-2E, arrow-headed solid lines denote communication traffic, and arrow-headed broken lines denote control information. As illustrated in FIGS. 2A-2E, the communication system 200 includes a base station #0 and mobile terminals #1-#4. The base station 110 illustrated in FIGS. 1A-1C applies to the base station #0.

Figure 2A:
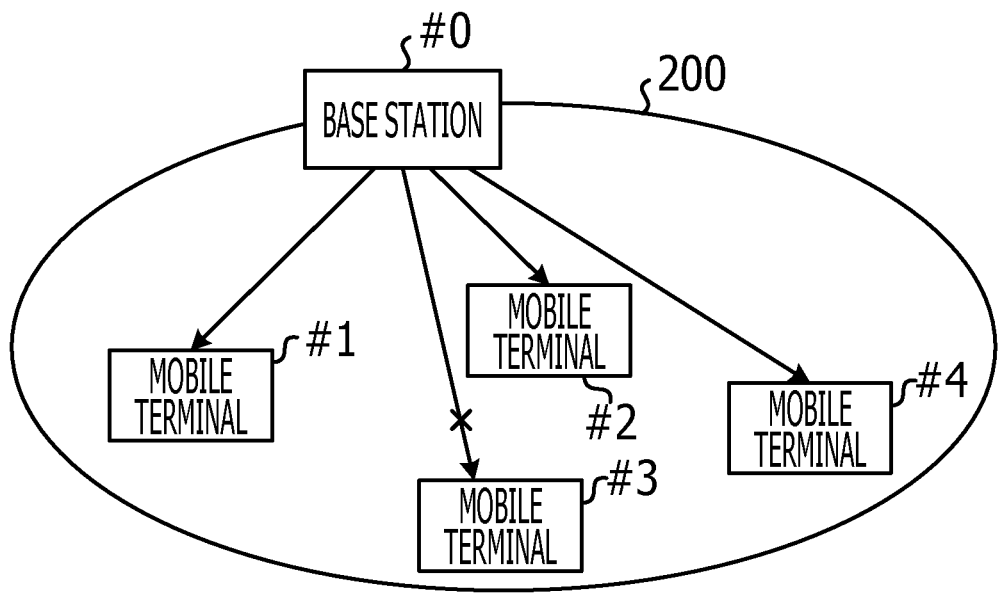
FIG. 2A illustrates an operation example of the communication system.

As illustrated in FIG. 2A, the base station #0 transmits a radio signal into which data respectively addressed to the mobile terminals #1-#4 is multiplexed. Each of the mobile terminals #1-#4 receives the radio signal from the base station #0. Each of the mobile terminals #1-#4 extracts data addressed to itself (own terminal) from the received radio signal, and decodes and error-detects the extracted own-terminal-addressed data.

In the discussion of FIG. 2A, it is assumed that the mobile terminal #3 has detected an error in the data addressed to itself (own terminal (the mobile terminals #3)), and the mobile terminals #1, #2, and #4 have not detected any errors in the data addressed thereto. Each of the mobile terminals #1-#4 temporarily stores the another-terminal addressed data included in the received radio signal. For example, the mobile terminal #2 temporarily stores data addressed to the mobile terminals #1, #2, and #3 included in the received radio signal.

Each of the mobile terminals #1-#4 transmits a negative acknowledgement (NACK) signal to the base station #0 and nearby mobile terminals if an error is included in the own-terminal-addressed data. Each of the mobile terminals #1-#4 transmits an acknowledgement (ACK) signal to the base station #0 if no error is included in the own-terminal-addressed data. Also if no error is included in the own-terminal-addressed data, each of the mobile terminals #1-#4 receives the NACK signal from a nearby mobile terminal, and measures a reception quality of the received NACK signal.

A mobile terminal having an error in the data addressed thereto and transmitting the NACK signal is hereinafter referred to as a NACK terminal (negative acknowledgement terminal). A mobile terminal having no error in the data addressed thereto and transmitting the ACK signal is hereinafter referred to as an ACK terminal (acknowledgement terminal). Referring to FIG. 2A, the mobile terminal #3 is a NACK terminal, and the mobile terminals #1, #2, and #4 are ACK terminals. The mobile terminal 130 illustrated in FIGS. 1A-1C is applied to the mobile terminal #3. The mobile terminal 120 illustrated in FIGS. 1A-1C is applied to each of the mobile terminals #1, #2, and #4.

Figure 2B:
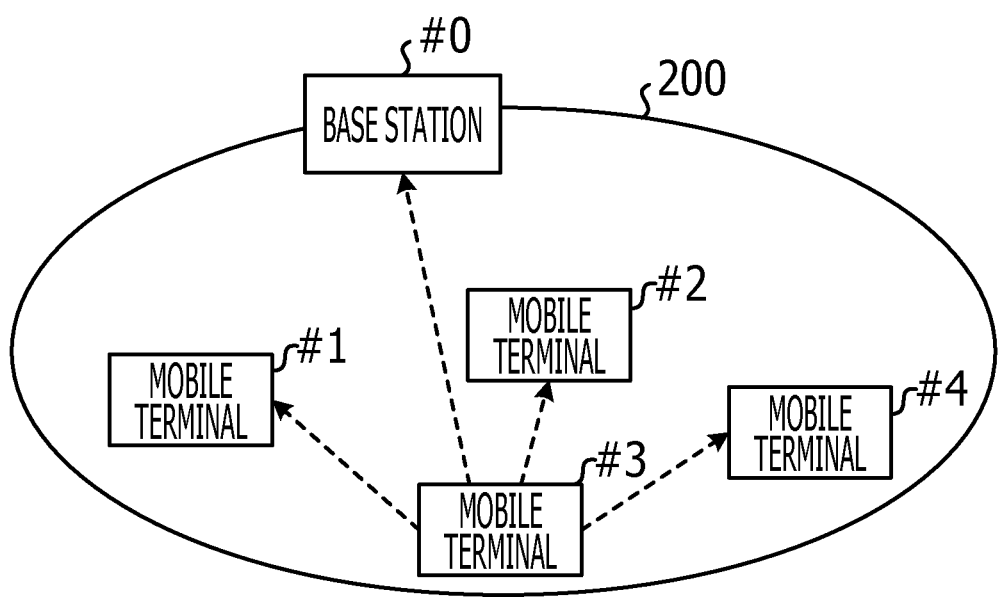
FIG. 2B illustrates an operation example of the communication system.

As illustrated in FIG. 2B, the mobile terminal #3 transmits the NACK signal. The mobile terminals #1, #2, and #4 receive the NACK signal from the mobile terminal #3 and measure the reception quality of the received NACK signal.

Figure 2C:
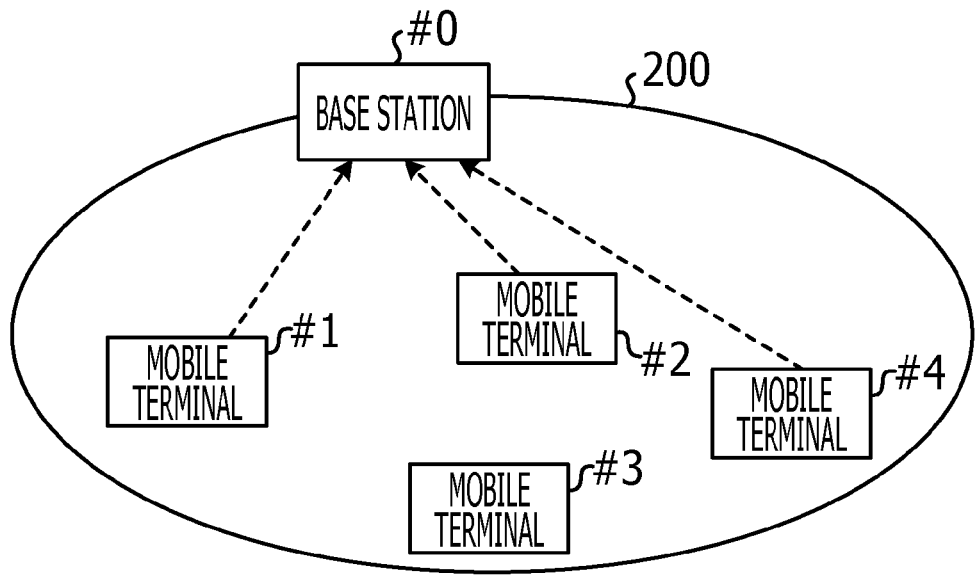
FIG. 2C illustrates an operation example of the communication system.

Referring to FIG. 2C, the mobile terminals #1, #2, and #4 as the ACK terminals transmit to the base station #0 reception information indicating that the NACK signal has been received from the mobile terminal #3. The reception signal transmitted by the mobile terminals #1, #2, and #4 may include quality information indicating measurement results of the reception quality of the NACK signal from the mobile terminal #3. The mobile terminals #1, #2, and #4 may transmit the reception information together with the ACK signal to the base station #0 or may transmit to the base station #0 the reception information which also serves as the ACK signal.

Figure 2D:
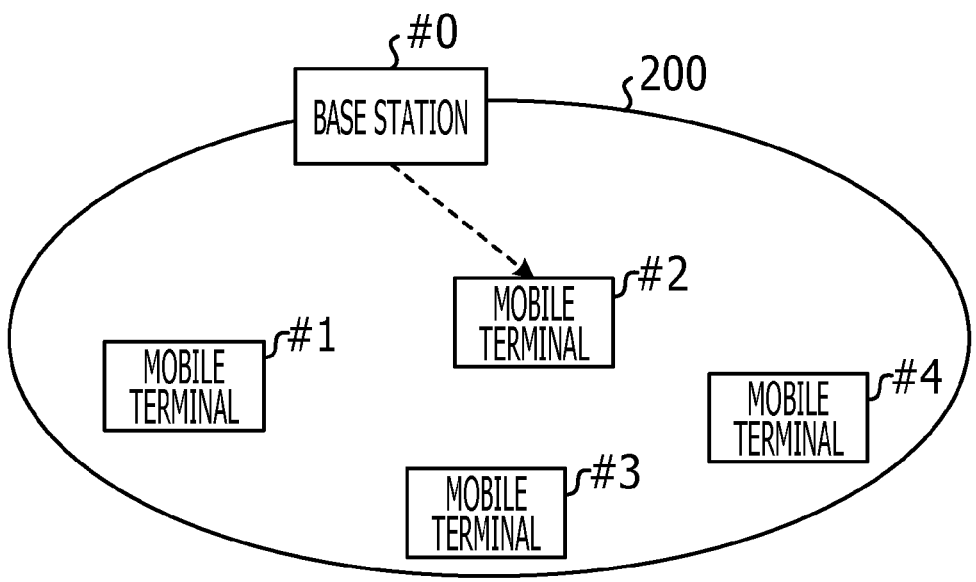
FIG. 2D illustrates an operation example of the communication system.

Referring to FIG. 2D, the base station #0 selects a retransmission source and a retransmission destination based on the reception information received from the mobile terminals #1, #2, and #4 as the ACK terminals. As illustrated in FIG. 2D, the base station #0 selects the mobile terminal #3 (the NACK terminal) as a retransmission destination. The base station #0 also selects the mobile terminal #2 from among the mobile terminals #1, #2, and #4 (the ACK terminals) as a retransmission source. The base station #0 transmits a retransmission request signal to the mobile terminal #2 selected as the retransmission source.

Upon receiving the retransmission request signal from the base station #0 as illustrated in FIG. 2E, the mobile terminal #2 reads the data addressed to the mobile terminal #3 received from the base station #0 and temporarily stored, and then transmits the read data to the mobile terminal #3. In the communication system 200, new data may be directly transmitted from the base station #0 to the mobile terminal #3 and the retransmission data may be transmitted from the mobile terminal #2 to the mobile terminal #3.

Structure Example of the Mobile Terminal

Figure 3:
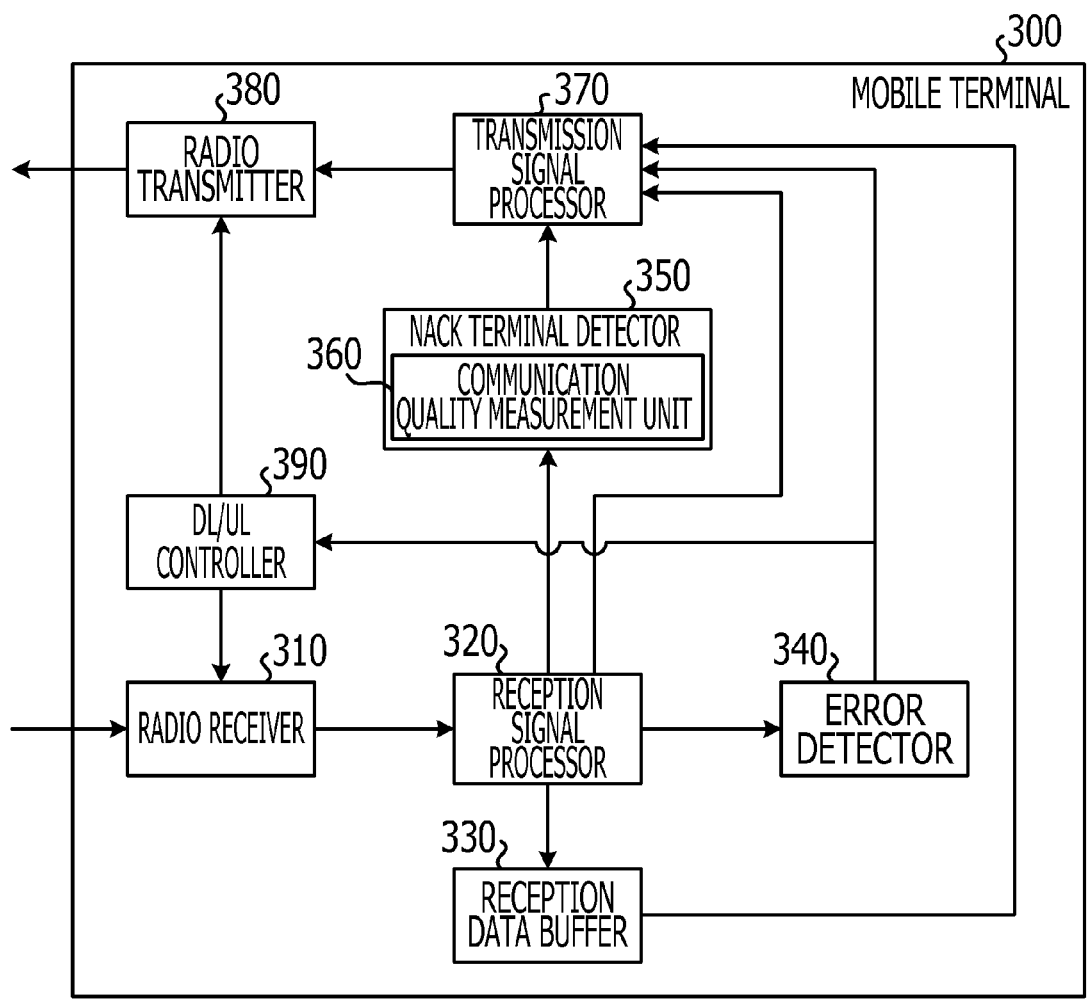
FIG. 3 is a block diagram illustrating a structure of a mobile terminal.

FIG. 3 is a block diagram illustrating a structure of a mobile terminal 300. As illustrated in FIG. 3, the mobile terminal 300 includes radio receiver 310, reception signal processor 320, reception data buffer 330, error detector 340, NACK terminal detector 350, communication quality measurement unit 360, transmission signal processor 370, radio transmitter 380, and DL/UL controller 390.

Figure 5:
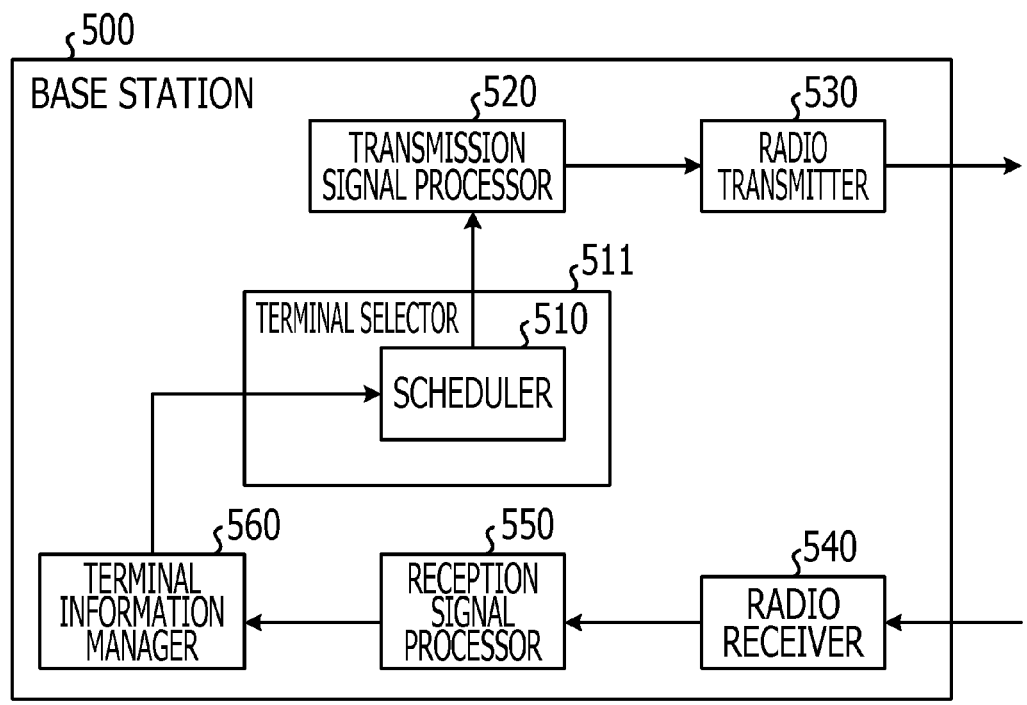
FIG. 5 is a block diagram illustrating a structure of a base station.

The radio receiver 310 receives a radio signal from a base station 500 (see FIG. 5). The radio receiver 310 also receives a radio signal from another mobile terminal present nearby. The radio receiver 310 outputs the received signal to the reception signal processor 320.

The reception signal processor 320 performs a reception process on the signal output from the radio receiver 310. More specifically, the reception signal processor 320 acquires data, included in the signal output from the radio receiver 310, in a form differentiated between own-terminal addressed data and another-terminal addressed data. For example, the reception signal processor 320 decodes a control signal included in the signal, thereby differentiating the data as to whether the data is the own-terminal addressed data or the another-terminal addressed data.

The reception signal processor 320 decodes the acquired own-terminal addressed data, and outputs the decoded own-terminal addressed data to the error detector 340. The reception signal processor 320 also outputs the acquired another-terminal addressed data to the reception data buffer 330. Alternatively, the reception signal processor 320 may output the another-terminal addressed data in an undecoded state.

The reception signal processor 320 acquires the NACK signal included in the signal from the radio receiver 310, and outputs the acquired NACK signal to the NACK terminal detector 350. The reception signal processor 320 acquires the retransmission request signal addressed to the mobile terminal 300 and included in the signal from the radio receiver 310, and outputs the acquired retransmission request signal to the transmission signal processor 370.

The reception signal processor 320 may have the function of a second measurement unit measuring a communication quality of communications between the mobile terminal 300 and the base station 500. For example, the reception signal processor 320 measures the communication quality in response to a reference signal exchanged between the mobile terminal 300 and the base station 500. The reception signal processor 320 compares the measured communication quality with a threshold value, thereby determining whether the communication quality of communications between the mobile terminal 300 and the base station 500 is good.

The reception data buffer 330 stores the another-terminal addressed data output from the reception signal processor 320. The error detector 340 detects an error in the own-terminal addressed data output from the reception signal processor 320, and outputs detection results to the transmission signal processor 370 and the DL/UL controller 390. The detection results output by the error detector 340 indicate whether the own-terminal addressed data is in error or not.

The NACK terminal detector 350 detects a NACK terminal near the mobile terminal 300 in response to the NACK signal output from the reception signal processor 320. The NACK terminal detector 350 outputs to the transmission signal processor 370 reception information indicating that the NACK signal has been received from the detected NACK terminal.

The NACK terminal detector 350 includes the communication quality measurement unit 360. The communication quality measurement unit 360 measures the communication quality of communications between the NACK terminal detected by the NACK terminal detector 350 and the mobile terminal 300. For example, the communication quality measurement unit 360 measures as the communication quality a reception quality of the NACK signal output from the NACK terminal detector 350. The NACK terminal detector 350 outputs to the transmission signal processor 370 the reception information including the quality information indicating the communication quality measured by the communication quality measurement unit 360.

The NACK terminal detector 350 may compare the communication quality measured by the communication quality measurement unit 360 with the threshold value, and output to the transmission signal processor 370 the reception information related to the NACK terminal having the communication quality equal to or higher than the threshold value. In such a case, the NACK terminal detector 350 does not output the reception information related to the NACK terminal having the communication quality lower than the threshold value.

The transmission signal processor 370 performs a transmission process to transmit a signal to the base station 500 and a nearby mobile terminal. For example, if the error detector 340 outputs the detection results indicating an error in the own-terminal addressed data, the transmission signal processor 370 outputs the NACK signal (the negative acknowledgement response) responsive to the own-terminal addressed data to the radio transmitter 380.

If the error detector 340 outputs the detection results indicating no error in the own-terminal addressed data, the transmission signal processor 370 outputs the ACK signal (the acknowledgement response) responsive to the own-terminal addressed data to the radio transmitter 380. The transmission signal processor 370 outputs to the radio transmitter 380 the reception information, output from the NACK terminal detector 350, together with the ACK signal.

If the reception signal processor 320 outputs the retransmission request signal, the transmission signal processor 370 reads from the reception data buffer 330 the another-terminal addressed data addressed to a retransmission destination indicated by the retransmission request signal, and then outputs the read another-terminal addressed data to the radio transmitter 380. The retransmission request signal includes information relating to a radio resource for data retransmission. The transmission signal processor 370 controls the radio transmitter 380 such that the radio resource indicated by the retransmission request signal transmits the another-terminal addressed data.

The radio transmitter 380 transmits the signal output from the transmission signal processor 370 to the base station 500 and another nearby mobile terminal. The DL/UL controller 390 controls the radio receiver 310 in the signal reception process thereof and the radio transmitter 380 in the signal transmission process thereof. If the error detector 340 outputs the detection results indicating that the data is not in error, the DL/UL controller 390 controls the radio receiver 310 such that a NACK signal is received from a nearby mobile terminal.

If the error detector 340 has detected an error in the data, the reception data buffer 330 under the control of the controller (not illustrated) in the mobile terminal 300 may discard the stored another-terminal addressed data. If the reception signal processor 320 determines that the communication quality between its own terminal and the base station 500 is lower than the threshold value, the reception data buffer 330 under the control of the controller in the mobile terminal 300 may discard the stored another-terminal addressed data.

Operation Example of the Mobile Terminal

Figure 4:
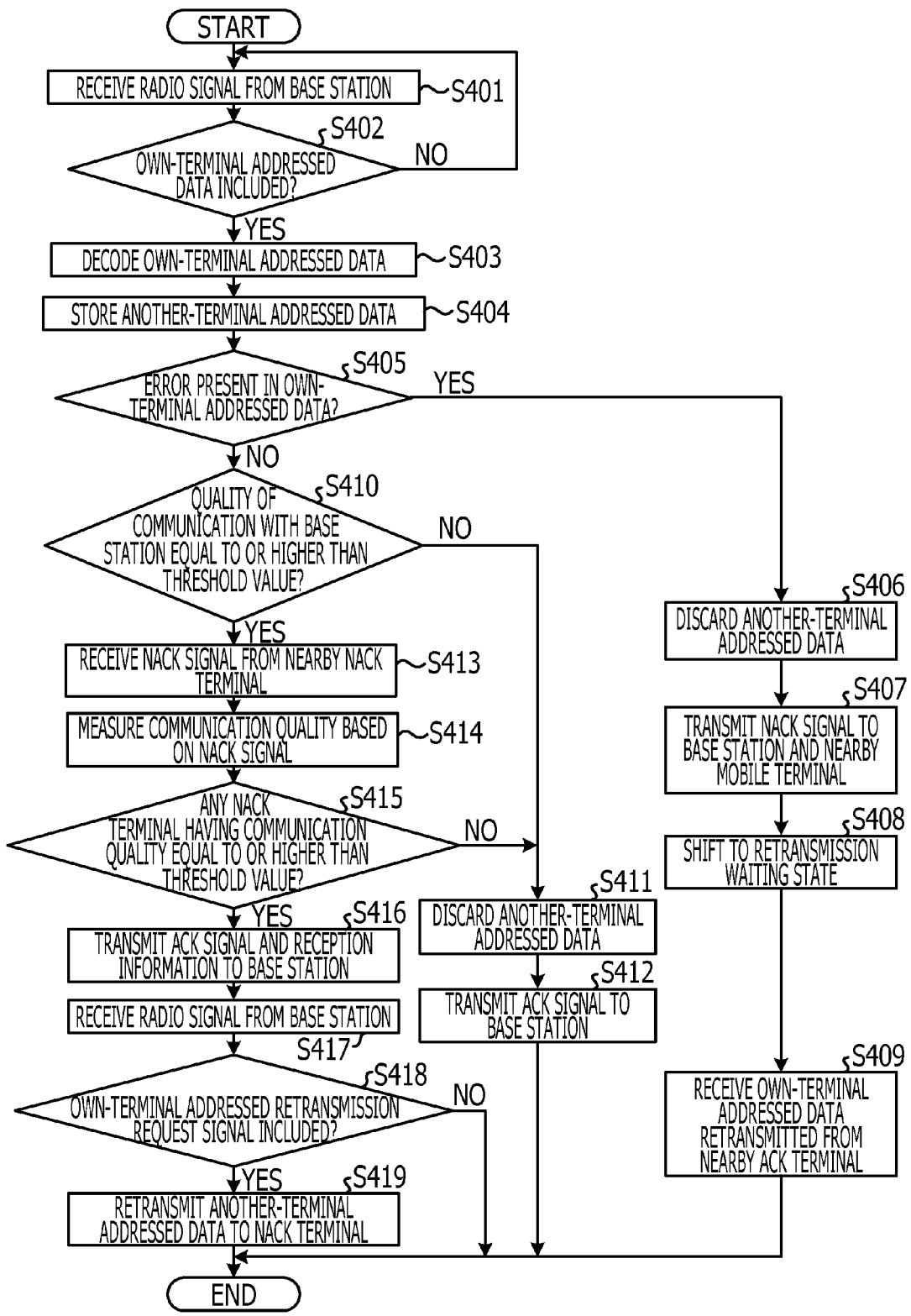
FIG. 4 illustrates an operation example of the mobile terminal.

FIG. 4 illustrates a process of the mobile terminal 300. The mobile terminal 300 performs the process operations described below. The radio receiver 310 receives the radio signal from the base station 500 (operation S401). The reception signal processor 320 then determines whether the own-terminal addressed data (new data) is included in the radio signal received in operation S401 (operation S402).

If it is determined in operation S402 that no own-terminal addressed data is included in the radio signal (no branch from operation S402), the mobile terminal 300 returns to operation S401 to continue operation in S401 and subsequent operation. This arrangement prevents the another-terminal addressed data received separately from the own-terminal addressed data from being stored. If the own-terminal addressed data is included in the radio signal (yes branch from S402), the reception signal processor 320 decodes the own-terminal addressed data (operation S403). The reception data buffer 330 stores the another-terminal addressed data included in the radio signal received in operation S401.

The error detector 340 determines whether the own-terminal addressed data decoded in operation S403 is in error (operation S405). If the own-terminal addressed data is in error (yes branch from operation S405), the reception data buffer 330 discards the another-terminal addressed data stored in operation S404 (operation S406).

The radio transmitter 380 transmits the NACK signal to the base station 500 and a nearby mobile terminal (operation S407). The radio receiver 310 under the control of the DL/UL controller 390 shifts to a standby state waiting for retransmission of the own-terminal addressed data (operation S408). The radio receiver 310 receives the own-terminal addressed data retransmitted from a nearby ACK terminal (operation S409). A series of operations thus ends.

If it is determined in operation S405 that the own-terminal addressed data is free from error (no branch from operation S405), the reception signal processor 320 determines whether the communication quality between its own terminal and the base station 500 is equal to or higher than the threshold value (operation S410). If the communication quality between its own terminal and the base station 500 is lower than the threshold value (no branch from operation S410), the reception data buffer 330 discards the another-terminal addressed data stored in operation S404 (operation S411). The radio transmitter 380 transmits to the base station 500 the ACK signal responsive to the own-terminal addressed data decoded in operation S403 (operation S412). A series of operations thus ends.

If the communication quality with the base station 500 is equal to or higher than the threshold value in operation S410 (yes branch from operation S410), the radio receiver 310 receives the NACK signal from a nearby NACK terminal (operation S413). The communication quality measurement unit 360 measures the communication quality of the NACK signal received in operation S413 (operation S414).

The NACK terminal detector 350 determines whether any NACK terminal has a communication quality measured in operation S414 equal to or higher than the threshold value (operation S415). If no NACK terminal has a communication quality equal to or higher than the threshold value (no branch from operation S415), the mobile terminal 300 proceeds to operation S411.

If it is determined in operation S415 that a NACK terminal has a communication quality equal to or higher than threshold value (yes branch from operation S415), the radio transmitter 380 transmits the ACK signal and the reception information to the base station 500 (operation S416). The ACK signal transmitted in operation S416 relates to the own-terminal addressed data decoded in operation S403. The reception information relates to the NACK terminal having a communication quality equal to or higher than threshold value.

The radio receiver 310 receives the reception information from the base station 500 (operation S417). The reception signal processor 320 determines whether the retransmission request signal addressed to its own terminal is included in the radio signal received in operation S417 (operation S418). If the retransmission request signal addressed to its own terminal is not included in the radio signal (no branch from operation S418), the mobile terminal 300 ends the series of operations.

If the retransmission request signal addressed to its own terminal is included in the radio signal (yes branch from operation S418), the radio transmitter 380 retransmits the another-terminal addressed data stored in operation S404 to the NACK terminal (operation S419). The series of operations thus ends.

Structure Example of the Base Station

FIG. 5 illustrates a structure of the base station 500. The base station 500 includes scheduler 510, transmission signal processor 520, radio transmitter 530, radio receiver 540, reception signal processor 550, and terminal information manager 560.

The scheduler 510 schedules radio communications between the base station 500 and each of the mobile terminals (including the mobile terminal 300). The scheduler 510 determines a radio resource for transmitting data to each mobile terminal. The scheduler 510 outputs schedule results to the transmission signal processor 520.

The scheduler 510 performs a retransmission control process in response to a response signal from a mobile terminal related to data transmitted from the transmission signal processor 520 and the radio transmitter 530. More specifically, the scheduler 510 schedules transmission of next data to the ACK terminal managed by the terminal information manager 560. The scheduler 510 also schedules retransmission of data to the NACK terminal managed by the terminal information manager 560.

The scheduler 510 includes a terminal selector 511. The terminal selector 511 selects an ACK terminal which is requested to retransmit the data to the NACK terminal managed by the terminal information manager 560, from among the ACK terminals managed by the terminal information manager 560. For example, the higher communication quality indicated by the quality information managed by the terminal information manager 560 the ACK terminal has, the terminal selector 511 selects the ACK terminal with the higher priority as an ACK terminal which is to be requested to retransmit the data to the NACK terminal.

The scheduler 510 outputs to the transmission signal processor 520 the retransmission request signal including information indicating the NACK terminal as a retransmission destination. The retransmission request signal is addressed to the ACK terminal selected as a retransmission source by the terminal selector 511. The retransmission request signal output to the transmission signal processor 520 is transmitted via the radio transmitter 530 to the ACK terminal selected as the retransmission source.

The scheduler 510 may output a plurality of retransmission request signals, one signal indicating the NACK terminal as a retransmission destination and the other signal indicating the ACK terminal as a retransmission source. For example, the scheduler 510 outputs a retransmission request signal requesting a first ACK terminal to perform a first retransmission to a first NACK terminal and a retransmission request signal requesting a second ACK terminal to perform a second retransmission to a second NACK terminal.

The scheduler 510 may have a function of an allocation unit. The allocation unit allocates the same radio resource as that of the first retransmission to the second retransmission if the first ACK terminal is far apart from the second ACK terminal. If the first ACK terminal is not far apart from the second ACK terminal, the scheduler 510 allocates to the second retransmission a radio resource different from that of the first retransmission.

If the reception information related to the second NACK terminal is not included in the reception information transmitted by the first ACK terminal, the scheduler 510 determines that the first ACK terminal is far from the second NACK terminal. If the reception information related to the second NACK terminal is included in the reception information transmitted by the first ACK terminal, the scheduler 510 determines that the first ACK terminal is not far from the second NACK terminal.

The scheduler 510 outputs allocation information to the transmission signal processor 520. The allocation information is addressed to the NACK terminal as the retransmission destination, and includes information indicating the ACK terminal as the retransmission source, and information indicating the radio resource allocated for data retransmission. The allocation information output to the transmission signal processor 520 is transmitted by the radio transmitter 530 to the NACK terminal as the retransmission destination.

The transmission signal processor 520 performs a transmission process in response to the schedule results output by the scheduler 510. More specifically, the transmission signal processor 520 outputs to the radio transmitter 530 a signal in which data addressed to each mobile terminal present within a cell of the base station 500 is multiplexed. The transmission signal processor 520 outputs to the radio transmitter 530 the retransmission request signal and the allocation information output by the scheduler 510.

The radio transmitter 530 transmits the signal from the transmission signal processor 520 as the radio signal to each mobile terminal present within the cell of the base station 500. The radio receiver 540 receives the radio signal from each mobile terminal present within the cell of the base station 500. The radio receiver 540 outputs the received signal to the reception signal processor 550.

The reception signal processor 550 performs a reception process on a reception signal output from the radio receiver 540. More specifically, the reception signal processor 550 acquires the response signals (including the NACK signal and the ACK signal) from each mobile terminal related to data included in the radio signal transmitted by the radio transmitter 530. The reception signal processor 550 acquires the reception information transmitted by the ACK terminal having transmitted the ACK signal. The reception signal processor 550 outputs to the terminal information manager 560 the acquired NACK signal, ACK signal, and reception information.

In accordance with the NACK signal and the ACK signal output from the reception signal processor 550, the terminal information manager 560 manages information related to the ACK terminal and the NACK terminal present within the cell of the base station 500. In accordance with the reception information output from the reception signal processor 550, the terminal information manager 560 manages the quality information indicating the communication quality of the ACK terminal as the transmission source of the reception information and the quality information indicating the communication quality between the ACK terminal as the transmission source of the reception information and the NACK terminal.

Operation Example of the Base Station

Figure 6:
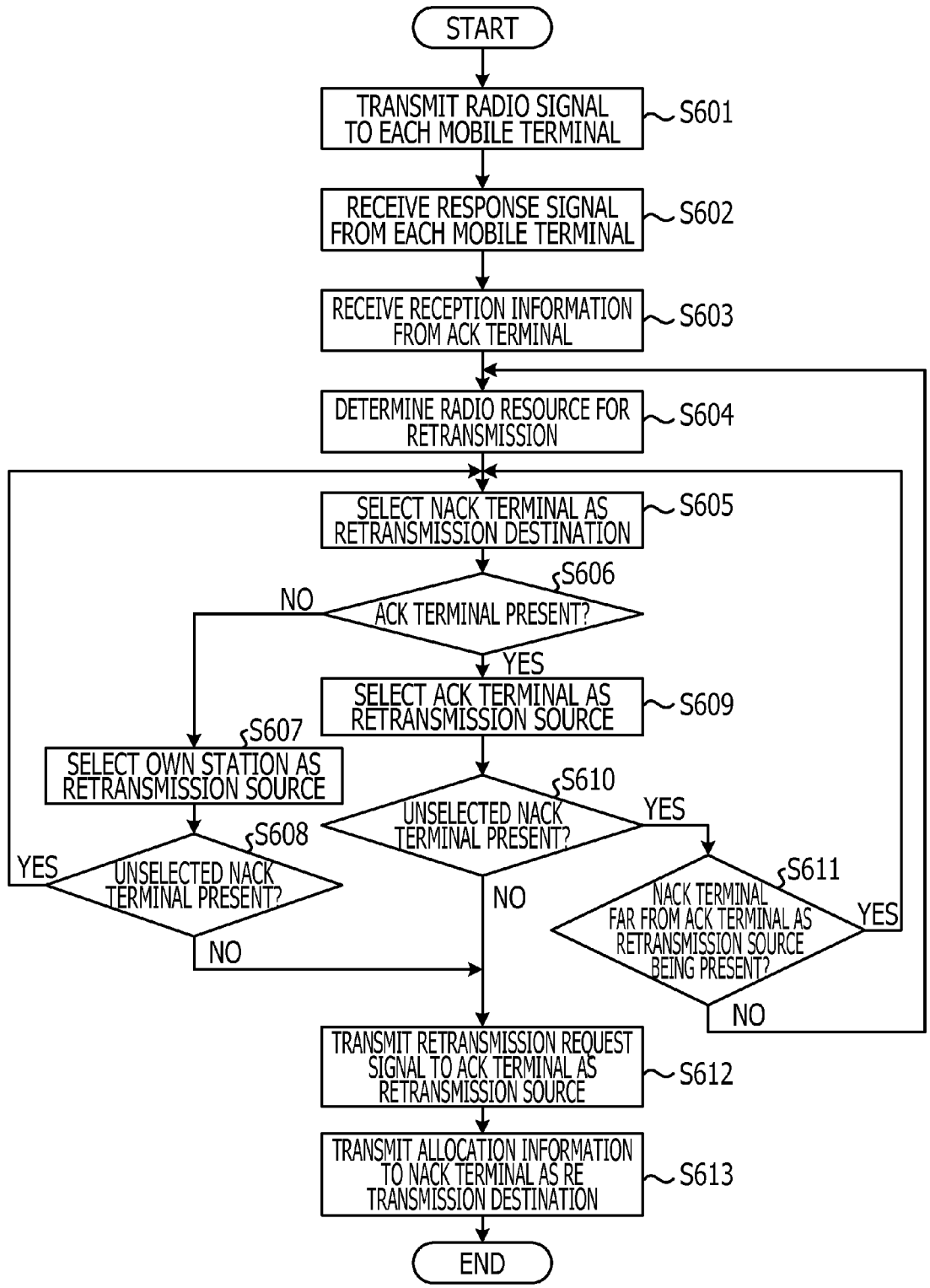
FIG. 6 illustrates an operation example of the base station.

FIG. 6 illustrates a process of the base station 500. The base station 500 performs the process operations described below. The radio transmitter 530 transmits to each mobile terminal the radio signal including data addressed to each mobile terminal (operation S601). The radio receiver 540 receives from each mobile terminal the response signals (the NACK signal and the ACK signal) related to the data transmitted in operation S601 (operation S602).

The radio receiver 540 receives the reception information transmitted from the ACK terminal (operation S603). The scheduler 510 determines the radio resource for retransmission of the data to the NACK terminal (operation S604). The terminal selector 511 selects the NACK terminal as a retransmission destination from among the NACK terminals from which the NACK signal has been received in operation S602 (operation S605). The terminal selector 511 excludes as a selection candidate a NACK terminal previously selected in operation S605.

The terminal selector 511 determines whether an ACK terminal from which an ACK signal is received in operation S602 is present (operation S606). If no such ACK terminal is present (no branch from operation S606), the terminal selector 511 selects itself as a retransmission source (operation S607). The terminal selector 511 determines whether a NACK terminal still not selected in operation S605 is present among the NACK terminals from which the NACK signal is received in operation S602 (operation S608).

If no such NACK terminal is present in operation S608 (no branch from operation S608), the base station 500 proceeds to operation S612. If such a NACK terminal is present in operation S608 (yes branch from operation S608), the base station 500 returns to operation S605.

If it is determined in operation S606 that such an ACK terminal (yes branch from operation S606), the terminal selector 511 selects an ACK terminal as the retransmission source from among the ACK terminals (operation S609). The terminal selector 511 then determines whether a NACK terminal still not selected in operation S605 is present (operation S610).

If it is determined in operation S610 that any unselected NACK terminal is present (yes branch from operation S610), the terminal selector 511 determines whether any NACK terminal far from the ACK terminal selected as the retransmission source in operation S609 is present from among the unselected NACK terminals (operation S611).

Upon receiving from the ACK terminal the reception information that the NACK signal has been received from a NACK terminal, the terminal selector 511 determines in operation S611 that the NACK terminal is not a NACK terminal far from the ACK terminal. Upon receiving from the ACK terminal the reception information that the NACK signal has been received from a NACK terminal, the terminal selector 511 determines in operation S611 that the NACK terminal is a NACK terminal far from the ACK terminal.

If a NACK terminal far from the ACK terminal as the retransmission source is present (yes branch from operation S611), the base station 500 returns to operation S605. Since no radio source is newly determined in operation S604, the retransmission is scheduled with the same radio resource as the radio resource determined previously.

If a NACK terminal far from the ACK terminal as the retransmission source is not present (no branch from operation S611), the base station 500 returns to operation S604. Since a radio resource is newly determined in operation S604, the retransmission is scheduled with a radio resource different from the radio resource determined previously.

If it is determined in operation S610 that no unselected NACK terminal is present (no branch from operation S610), the radio transmitter 530 transmits the retransmission request signal to the ACK terminal as the retransmission source selected in operation S609 (operation S612). It is not necessary to transmit to the ACK terminal the retransmission request signal addressed to the NACK terminal that is its own terminal and selected as the retransmission source in operation S607. The radio transmitter 530 transmits the allocation information to the NACK terminal selected as the retransmission destination in operation S605 (operation S613). The series of operations thus ends.

FIGS. 7A-7D illustrate the retransmission of the data by the same radio resource. In FIGS. 7A-7D, elements identical to those in FIGS. 2A-2E are designated with the same reference numerals. Here, the mobile terminals #1 and #4 are NACK terminals, and the mobile terminals #2 and #3 are ACK terminals.

Figure 7A:
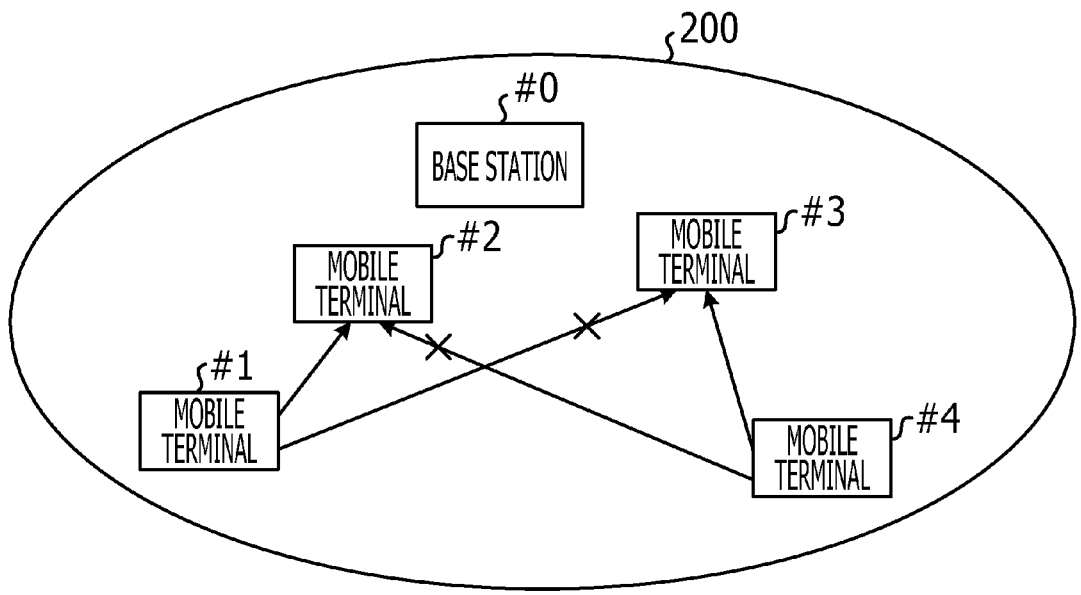
FIG. 7A illustrates a data retransmission by the same radio resource.

Referring to FIG. 7A, the NACK signal transmitted from the mobile terminal #1 is received by the mobile terminal #2 near the mobile terminal #1, but not received by the mobile terminal #3 far from the mobile terminal #1. The NACK signal transmitted by the mobile terminal #4 is received by the mobile terminal #3 but not received by the mobile terminal #2 far from the mobile terminal #4.

Figure 7B:
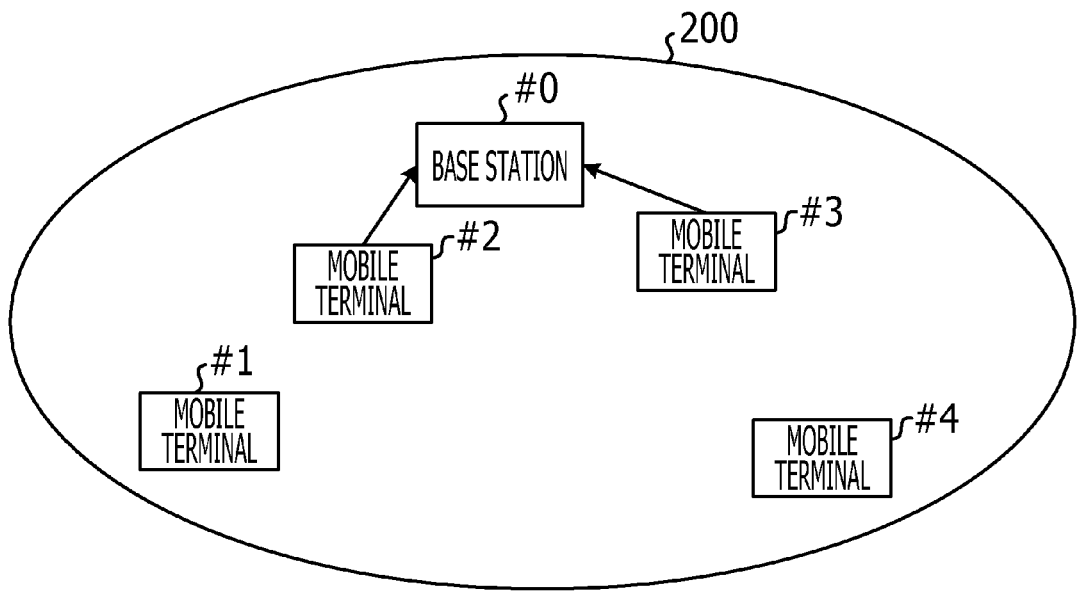
FIG. 7B illustrates a data retransmission by the same radio resource.

Referring to FIG. 7B, the mobile terminal #2 transmits to the base station #0 the reception information that the mobile terminal #2 has received the NACK signal from the mobile terminal #1. The mobile terminal #3 transmits to the base station #0 the reception information that the mobile terminal #3 has received the NACK signal from the mobile terminal #4.

Figure 7C:
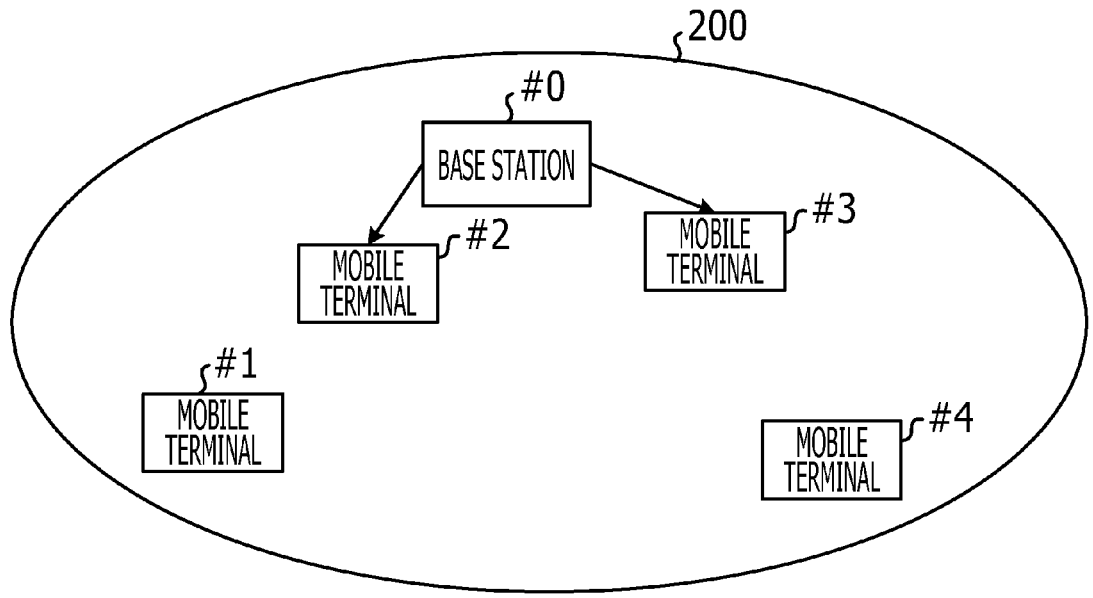
FIG. 7C illustrates a data retransmission by the same radio resource.

Referring to FIG. 7C, the base station #0 transmits to the mobile terminal #2 the retransmission request signal requesting the data to be retransmitted to the mobile terminal #1. The base station #0 also transmits to the mobile terminal #3 the retransmission request signal requesting the data to be retransmitted to the mobile terminal #4.

Since the reception information received from the mobile terminal #2 does not include the reception information related to the mobile terminal #4, the base station #0 allocates to the retransmission to the mobile terminal #4 the same radio resource of the retransmission to the mobile terminal #1. More specifically, the base station #0 transmits to the mobile terminal #2 and the mobile terminal #3 the retransmission request signal including information indicating the same radio resource.

Figure 7D:
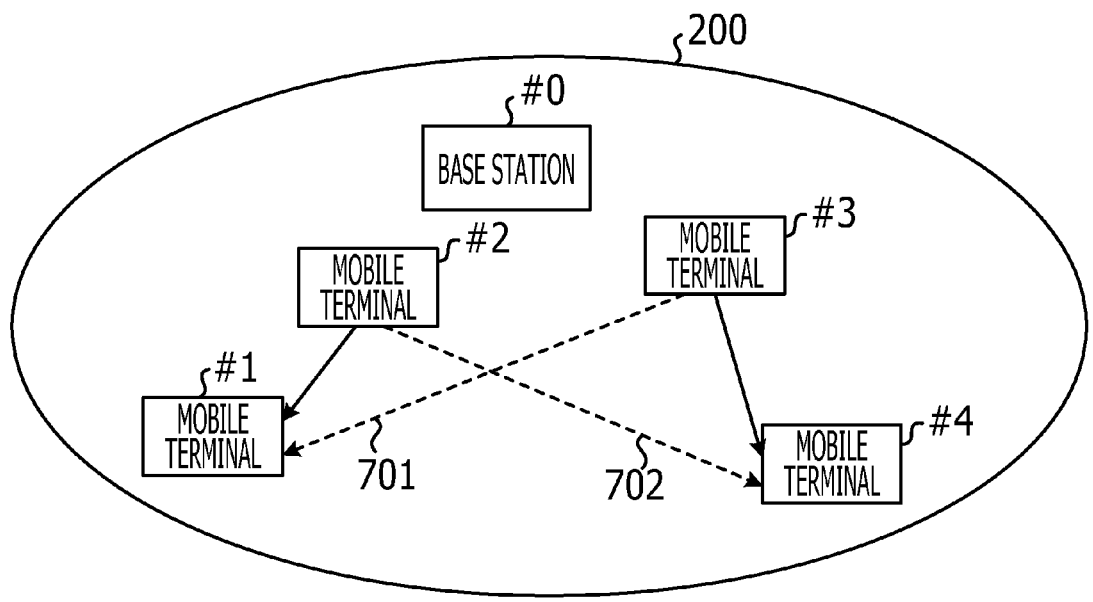
FIG. 7D illustrates a data retransmission by the same radio resource.

Referring to FIG. 7D, the mobile terminal #2 retransmits the data to the mobile terminal #1. The mobile terminal #3 retransmits the data to the mobile terminal #4. The retransmission by the mobile terminals #2 and #3 is performed using the same radio resource. Since the mobile terminal #3 is far from the mobile terminal #1, interference 701 of the mobile terminal #3 on the mobile terminal #1 is small. Since the mobile terminal #2 is far from the mobile terminal #4, interference 702 of the mobile terminal #2 on the mobile terminal #4 is small. Even if the mobile terminals #2 and #3 retransmit the data using the same radio resource, interference between the retransmissions is controlled.

In accordance with the mobile terminal, the base station, the communication system, and the communication method as described above, new data is directly transmitted from the base station to the mobile station as a destination, and retransmission data is transmitted from another mobile terminal to the destination mobile terminal. This arrangement may advantageously control the delay in the transmission of the new data.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that various changes, substitutions, and alterations could be made hereto without departing from the spirit and scope of the invention.

The invention claimed is:

1. A mobile terminal, comprising:
    a data receiver that receives data, the data transmitted by a base station to another mobile terminal;
    a response receiver that receives from the other mobile terminal a negative acknowledgement response transmitted by the other mobile terminal to the base station indicating that the other mobile terminal has failed to receive the data normally;
    a data transmitter that transmits to the other mobile terminal the data, received by the data receiver, after the negative acknowledgement response received by the response receiver; and
    a processor configured to measure a communication quality of communications with the other mobile terminal, wherein the data transmitter transmits the data if the communication quality measured by the processor is equal to or higher than a threshold value.

2. The mobile terminal according to claim 1, further comprising:
    a memory that stores the data received by the data receiver, wherein the data transmitter transmits to the other mobile terminal the data stored in the memory.

3. The mobile terminal according to claim 2, wherein the memory stores the data together with data addressed to the mobile terminal itself.

4. The mobile terminal according to claim 2, wherein the memory stores the data in an undecoded state.

5. The mobile terminal according to claim 1, wherein the measurement unit measures as the communication quality a reception quality of the negative acknowledgement response received by the response receiver.

6. The mobile terminal according to claim 1, further comprising:
    a reception information transmitter that transmits, to the base station, reception information indicating that the response receiver has received the negative acknowledgement response from the other mobile terminal; and
    a request receiver that receives a retransmission request signal transmitted by the base station based on the reception information transmitted by the reception information transmitter,
    wherein the data transmitter transmits the data if the request receiver has received the retransmission request signal.

7. The mobile terminal according to claim 6, further comprising:
    a measurement unit that measures a communication quality of communications with the other mobile terminal,
    wherein the reception information transmitter transmits, together with the reception information, quality information indicating the communication quality measured by the measurement unit.

8. The mobile terminal according to claim 1, further comprising:
    a second measurement unit that measures a communication quality of communications with the base station,
    wherein the data transmitter transmits the data if the communication quality measured by the second measurement unit is equal to or higher than a threshold value.

9. The mobile terminal according to claim 1, wherein the data received by the mobile terminal is addressed to a terminal other than the mobile terminal itself.

10. A mobile terminal, comprising:
    a first-data receiver that receives data transmitted by a base station to the mobile terminal itself;
    a response transmitter that transmits a negative acknowledgement response to the base station indicating that the first-data receiver has failed to receive normally the data;
    a second-data receiver that receives, after the negative acknowledgement response from the response transmitter, the data transmitted by another mobile terminal; and
    a processor configured to measure a communication quality of communications with the other mobile terminal, wherein the second-data receiver receives the data if the communication quality measured by the processor is equal to or higher than a threshold value.

11. A communication system comprising a base station and a plurality of terminals, wherein the base station comprises
    a data transmitter that transmits data respectively addressed to the plurality of terminals;
    and each of the plurality of terminals comprises
    a receiver that receives data addressed to a another terminal, the data transmitted by the base station to the other terminal;
    a transmitter that transmits the data to the other terminal based on a negative acknowledgement response related to the data and transmitted from the other terminal to the base station; and
    a processor configured to measure a communication quality of communications with the other mobile terminal, wherein the transmitter transmits the data if the communication quality measured by the processor is equal to or higher than a threshold value.

12. A communication method comprising:
    transmitting, by a base station, data respectively addressed to a plurality of terminals;

receiving, by a terminal, data addressed to another terminal, the data transmitted by the base station to the other terminal;

transmitting the data, by the terminal to the other terminal based on a negative acknowledgement response related to the data, wherein the negative acknowledgement response is transmitted from the other mobile terminal to the base station; and measuring a communication quality of communications with the other mobile terminal, wherein if the measured communication quality between the terminal and the other terminal is equal to or higher than a threshold value the terminal transmits the data to the other terminal.

13. The method of claim 12 further comprising:

transmitting by the terminal to the base station, reception information indicating that a negative acknowledgement response from the other mobile terminal has been received; and receiving by the terminal a retransmission request signal transmitted by the base station based on the reception information; and transmitting the data, by the terminal, based on receiving the retransmission request.

* * * * *